United States Patent
Jackson

(10) Patent No.: US 6,807,612 B2
(45) Date of Patent: *Oct. 19, 2004

(54) SYSTEM AND METHOD TO IMPROVE SPEED AND REDUCE MEMORY ALLOCATION FOR SET TOP BOX BOOT-UP

(75) Inventor: Gregor Said Jackson, Los Gatos, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 10/390,832

(22) Filed: Mar. 17, 2003

(65) Prior Publication Data

US 2003/0188118 A1 Oct. 2, 2003

Related U.S. Application Data

(63) Continuation of application No. 09/672,106, filed on Sep. 27, 2000, now Pat. No. 6,560,685.

(51) Int. Cl.$^7$ ................................................. G06F 12/00
(52) U.S. Cl. .................... 711/165; 725/152; 710/66; 710/35
(58) Field of Search ....................... 711/165; 710/66; 340/658; 725/132, 140, 152; 455/130, 150.1, 154.1

(56) References Cited

U.S. PATENT DOCUMENTS

| | | | |
|---|---|---|---|
| 5,109,521 A | 4/1992 | Culley | 395/800 |
| 5,912,995 A | 6/1999 | He | 382/297 |
| 5,966,138 A | 10/1999 | Tanaka | 345/437 |
| 6,226,736 B1 | 5/2001 | Niot | 712/38 |
| 6,560,685 B1 | 5/2003 | Jackson | 711/165 |

*Primary Examiner*—Reginald G. Bragdon
*Assistant Examiner*—Paul Baker
(74) *Attorney, Agent, or Firm*—Haverstock & Owens LLP

(57) ABSTRACT

A system and corresponding method for improving set-top box boots up efficiency while, at the same time, reducing the memory allocation required for set-top box boot-up is disclosed. The boot-up method includes performing a vertical direct memory access transfer of relevant program instructions from a system non-volatile memory to system main memory. The transferred program instructions are then re-arranged into consecutive locations within the main memory.

25 Claims, 4 Drawing Sheets

SYSTEM AND METHOD TO IMPROVE SPEED AND REDUCE MEMORY ALLOCATION FOR SET TOP BOX BOOT-UP

The present application is a continuation of U.S. Ser. No. 09/672,106 filed Sep. 27, 2000 now U.S. Pat. No. 6,560,685 which is incorporated by reference herein in its entirety.

NOTICE OF COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

1. Field of the Invention

The present invention generally relates to microprocessor based media systems and, more particularly, to a system and method of improving the boot-up time of set-top boxes.

2. Background of the Invention

Set-top boxes are microprocessor-based controllers that control the operation of media systems. Known set-top boxes include cable converter boxes or satellite system converter boxes. Set-top boxes are used to control the conversion of the media signal transmitted from a content provider into the images and sounds that are provided by a corresponding media display device.

Set-top boxes generally include a processor, a non-volatile memory (i.e. EPROM, NVRAM, ROM, etc.) for storing program instructions that controls media signal conversion when the set-top box is off, and a main memory (i.e. SDRAM, DRAM, etc.) which provides fast processor access to the program instructions when the set-top box is on. In operation, viewing media system programming (e.g. cable television programs) requires that the set-top box be turned on. Upon being turned on, the set-top box "boots up" by first performing a series of internal self tests and then transferring the program instructions residing in the non-volatile memory to the main memory. Once the program instructions and any necessary data have been transferred to main memory, the processor then starts executing the program instructions.

A drawback associated with conventional set-top boxes is that the boot-up time is extremely slow. During boot-up, the program instructions are copied from the non-volatile memory to the main memory in a byte-by-byte fashion. The copy process includes performing the following steps in an iterative fashion per byte of memory: (1) writing a start memory address of the non-volatile memory to begin copying from; (2) transfering the byte of instructions stored in the memory location identified by that address; and (3) initiating a reset cycle in order to clear the data bus before the writing of a subsequent memory address and data transfer therefrom. This boot-up process generally takes 4–5 seconds to complete since non-volatile memory (e.g. ROM) is usually arranged in 8-bit data paths and the corresponding processor executes from a 32-bit RAM.

Another drawback associated with conventional boot-up of set-top boxes is that it requires a large amount of available main memory space. As discussed above, the transfer of media system control instructions is performed in a byte-by-byte fashion until completion. Since the processor executes 32-bit transfers, but the non-volatile memory only performs 8-bit transfers, 3 bytes of unused or invalid information are stored in main memory per transfer. This unused or invalid data quickly fills up and essentially wastes valuable main memory space; thereby, requiring a larger amount of memory to boot-up the media system.

SUMMARY OF THE INVENTION

The aforementioned and related drawbacks associated with conventional boot-up of set-top boxes are substantially reduced or eliminated by the present invention. The present invention is directed to a system and corresponding method that enhances media system performance by reducing set-top box boot-up time while requiring less memory space during initial data transfer. According to the present invention, set-top box boot-up begins with a direct memory access (DMA) block transfer of program instructions from a non-volatile memory to main memory. In a preferred embodiment of the present invention, the main memory is implemented as a 32-Mbyte synchronous dynamic random access memory (SDRAM) which provides for fast access. After the DMA transfer, the bytes of program instructions are then horizontally and vertically re-arranged within the main memory space.

More specifically, the method of efficiently booting up a set-top box according to the present invention comprises the steps of: block transferring instructions stored in the addressed location of non-volatile memory into main memory; and re-configuring the transferred instructions within the main memory. The re-configuring of the transferred instructions is performed directly within the main memory. Thus, the main memory arrangement is completed very quickly.

An advantage provided by the present invention is that it enhances set-top box efficiency by greatly reducing boot-up time.

Another advantage provided by the present invention is that it requires less memory to be used during boot-up.

A feature of the present invention is that it can be implemented in conjunction with any embedded system.

BRIEF DESCRIPTION OF THE DRAWINGS

The aforementioned and related advantages and features of the present invention will become apparent to one of ordinary skill in the art upon reviewing the following detailed description of the invention, taken in conjunction with the following drawings, where like numerals represent like elements, in which.

DETAILED DESCRIPTION OF THE INVENTION

The system and method for efficiently booting-up a set-top box according to the present invention will now be described with reference to FIGS. 1–4. As discussed above, set top boxes are processor-based controllers that control the conversion of media signals transmitted by a content provider, such as a cable system or satellite television provider, into the images and sounds that are provided by an appropriate media display device. The program instructions, and any corresponding data, used to provide set-top box functionality are stored in non-volatile memory, such as an electrically programmable read only memory (EPROM) or a non-volatile random access memory (NVRAM), when the set top box is turned off.

Upon being turned on, the set-top box performs an initialization routine including a series of operation self tests and then transfers the control instructions from the non-volatile memory to the main memory of the set-top box, such as a dynamic random access memory (DRAM) for execution by the processor. In conventional set-top boxes, this transfer of program code from the non-volatile memory to the main memory is often extremely slow. As much as four to five seconds can elapse between the set-top box being turned on and the completion of the boot-up process which is identified by the appearance of an image on the display device.

Figure 1:
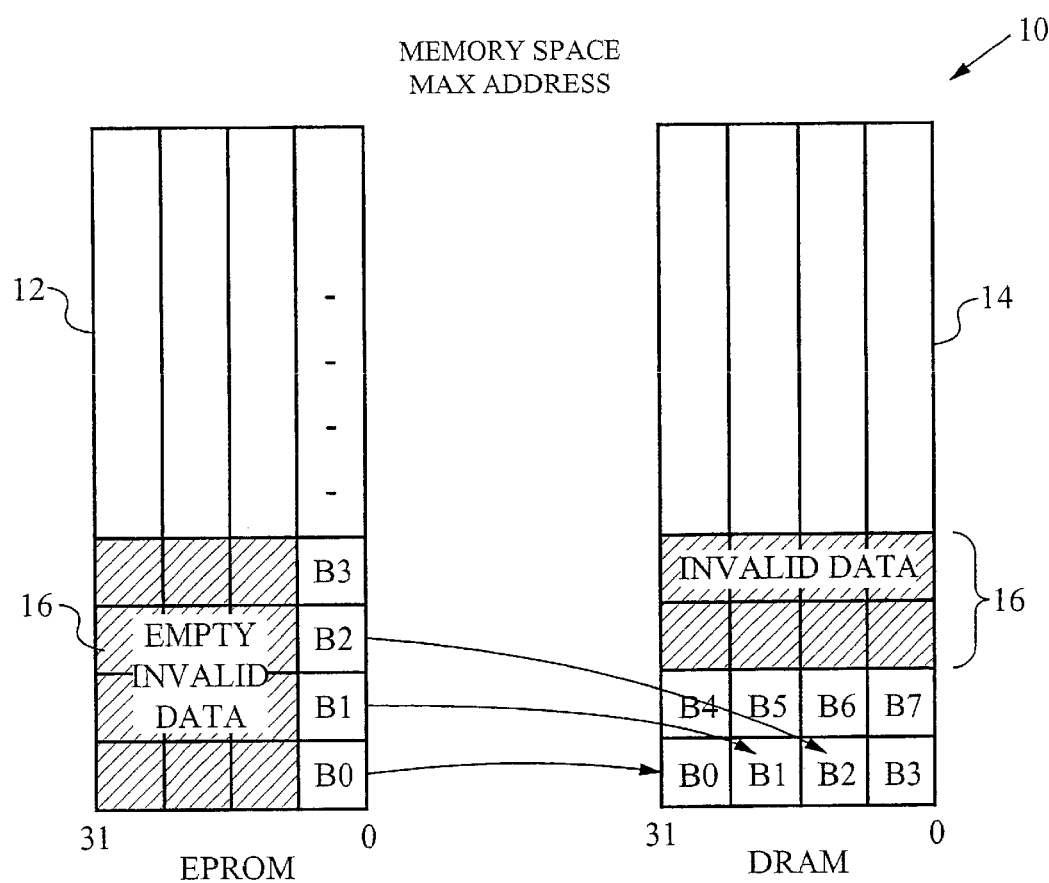
FIG. 1 is a schematic representation of the memory space of a set-top box after conventional boot-up.

FIG. 1 is a schematic representation of the memory space 10 of a conventional set-top box after the completion of a conventional boot up. Memory space 10 includes a non-volatile memory (represented as an EPROM) 12 and a main memory (represented as an SDRAM) 14. The EPROM 12 has an 8-bit data bus (not shown) which is used to transfer the instructions contained therein (represented as bytes B0, B1, B2, etc) to other components of the set-top box. As used herein, the term instructions is meant to include program code and any corresponding data that is stored in a memory location within the set-top box and can be executed or processed by a processor. Due to this configuration, the non-volatile memory 12 also includes some bytes of memory 16 that are unused. During initialization (referred to as "booting-up") of the conventional set-top box, the instructions stored in the non-volatile memory 12 are transferred (copied) to the main memory 14 for execution by the processor (not shown) in the following manner: (1) the start address of the first byte (B0) of the non-volatile memory space 12 is obtained; (2) the byte (B0) is read from the non-volatile memory 12; (3) this byte is then written to the main memory space 14 (represented by the arrow) and concatenated into 32-bits inside the main memory; (4) a reset cycle is initiated to clear the data bus before writing the instructions stored in a subsequent non-volatile memory address. These steps are repeated, per byte, until the contents of the entire non-volatile memory space 12 has been copied to main memory 14. This is an extremely slow process, often taking as much as 5 seconds to complete. This means that there is a 5 second delay between the time the user turns on (or activates) the set-top box and a picture appearing on the corresponding display device. This can become burdensome to the user.

As further illustrated in FIG. 1, only 8-bits of information are used (transferred) by the non-volatile memory 12. As the main memory 14 uses a 32-bit data bus, data transfer is performed 32-bits at a time. This means that 3 bytes of memory per transfer contain either unused or invalid information or instructions. This can result in a significant waste of resources, as the main memory 14 is being filled up with either unused or invalid information (represented by dashed lines) 16. Thus, a large amount of memory is required to boot-up the set-top box. In some circumstances, the amount of main memory available may be insufficient to satisfy the boot-up requirement; thereby preventing the corresponding media system from functioning properly. The timing and space limitations associated with the conventional boot-up process are overcome by the improved boot-up method of the present invention.

Figure 2:
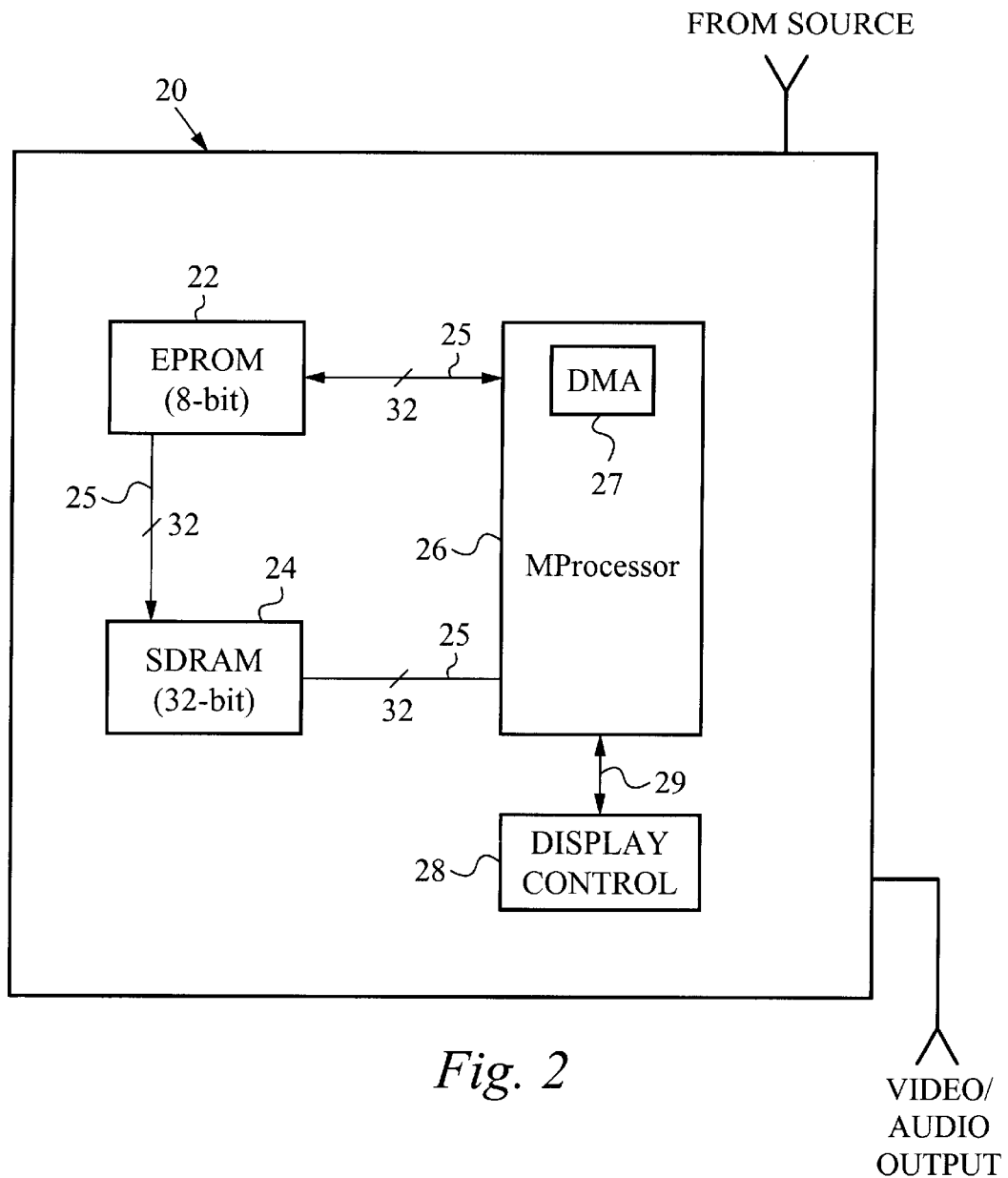
FIG. 2 is a block diagram of a set-top box which performs the improved boot-up method of the present invention.

FIG. 2 is a block diagram of a set-top box structure configured to perform the improved boot-up method of the present invention. In an exemplary embodiment of the present invention, the set-top box is a cable converter box 20 including a non-volatile memory 22, a main memory 24, a processor 26 and display control logic 28. The non-volatile memory 22, main memory 24 and processor 26 communicate with each other through a 32-bit data bus 25. The processor 26 is in communication with the display control logic 28 through a bi-directional data bus 29. The converter box 20 is operative to convert an input media broadcast signal from a content provider (i.e. cable television service) SOURCE into the sounds and visual images VIDEO/AUDIO OUTPUT that are provided to the user on an appropriate display device (not shown). In an exemplary embodiment of the present invention, the non-volatile memory 22 is implemented as an 8-bit electrically programmable read only memory (EPROM), which stores the instructions for controlling the converter box 20 when the converter box 20 is turned off. The main memory is implemented as a 32-bit synchronous dynamic random access memory (SDRAM) 24, which provides fast data access and stores the instructions that are executed by the processor 26 when the converter box 20 is on.

The processor 26 of the present invention is a TRIMEDIA microprocessor, manufactured by Philips Electronics, Inc., which includes a direct memory access (DMA) engine 27 for providing rapid block transfer of instructions between the non-volatile memory (EPROM) 22 and the main memory (SDRAM) 24. The display control logic 28 provides the formatted video and audio signals to a display device (not shown). The display device can be a television monitor. Although discussed as a cable television display system, the present invention can be used in conjunction with a high definition television (HDTV) system, or any embedded system. The improved boot-up process of the present invention will now be described with reference to FIGS. 3 and 4.

Figure 3A:
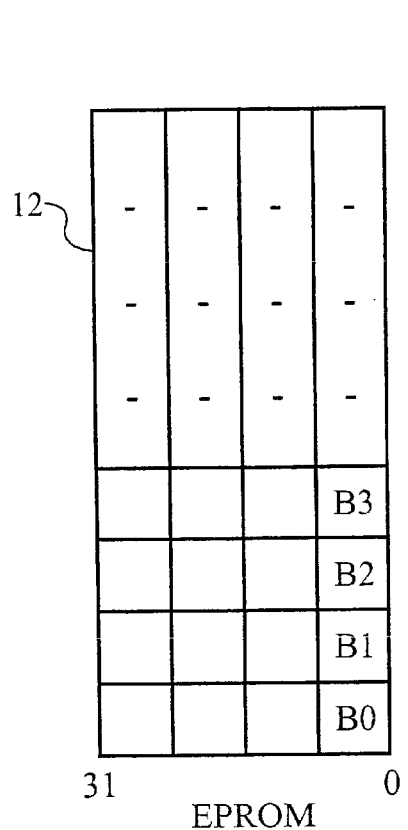
FIG. 3(a) and FIG. 3(b) are a schematic representation of the memory space of the set-top box illustrated in FIG. 2 during the performance of the improved boot-up method of the present invention.
Figure 3B:
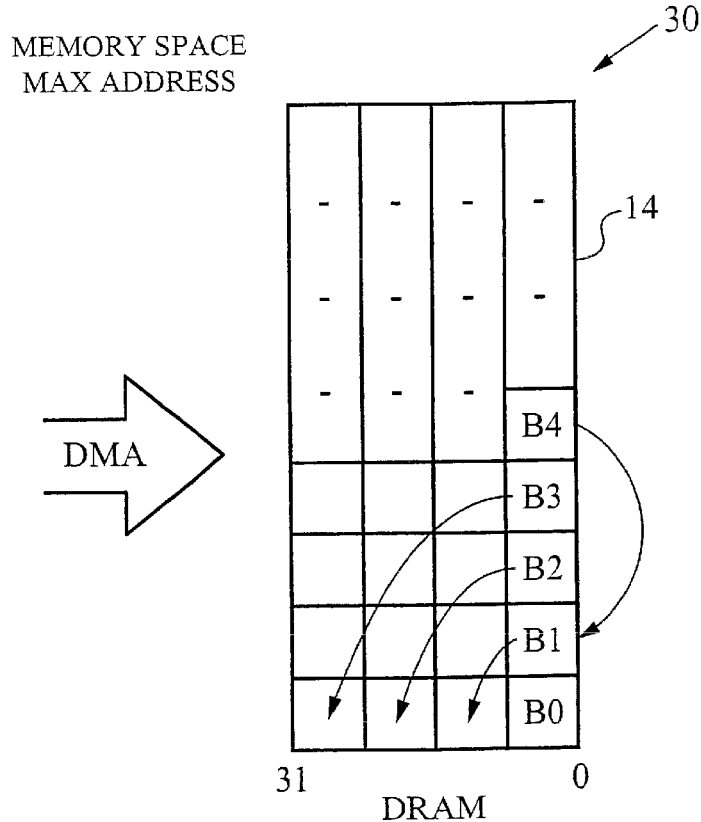
Figure 4:
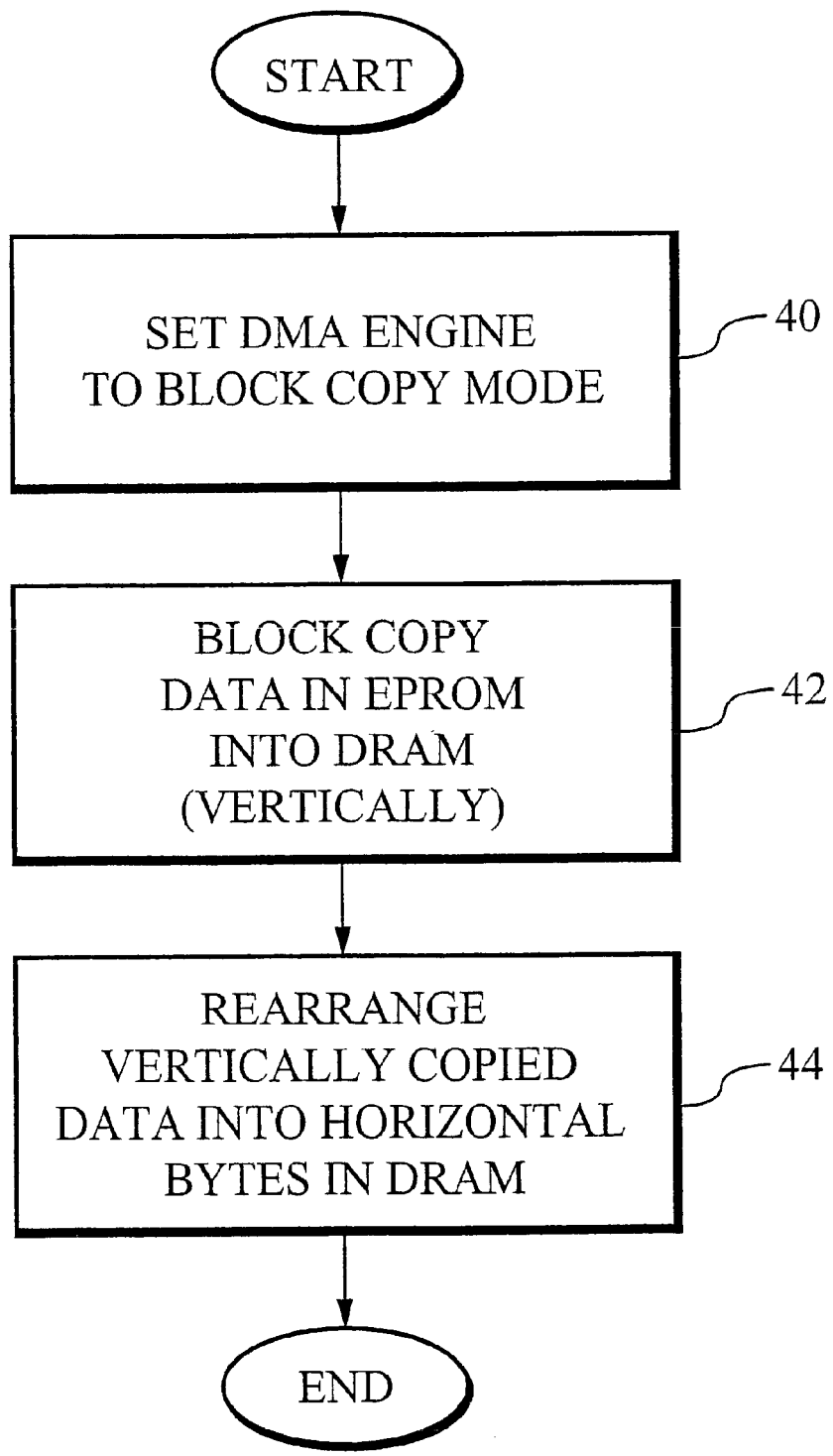
FIG. 4 is a flow chart illustrating the improved boot-up method of the present invention.

FIG. 3(a) and FIG. 3(b) are a schematic representation of the memory space 30 of the converter box 20 illustrated in FIG. 2 after performing the improved boot-up method of the present invention. FIG. 4 is a flow chart illustrating the operating steps performed by the converter box 20 of the present invention. Referring to FIG. 4, the boot-up process starts by the microprocessor 26 setting the DMA engine 27 to copy 32-bits of external (EPROM) memory 22 into SDRAM 24, as illustrated in step 40. Next, in step 42, a DMA is performed to block copy the instructions (32-bit) from the EPROM 22 into the SDRAM 24, as illustrated by the arrow (FIG. 3). The block transfer is performed by the DMA engine 27 by executing the following instructions on the microprocessor 26:

MMIO(0X103060)=0xfc00048f;
dest_address=(unsigned long*) (1024*1024*6);
MMIO(BIU_STATUS)=0x20;
MMIO(SRC_ADR)=flash_addr;
MMIO(DEST_ADR)=dest_address;
MMIO(DMA_CTL)=(((L2_CODE_SIZE*4)+63) & 0xffffffc0
(0<<27) (1<<26);
while (! (MMIO(BIU_STATUS) & (1<<5)));

As illustrated by the program code above, the microprocessor 26 performs a DMA block transfer of instructions from a given EPROM memory location to a given address in the SDRAM 24. The block transfer is performed in a vertical orientation, such that after the block transfer, the SDRAM 24 memory space is identical to the corresponding memory space in the EPROM 22 (as illustrated in FIG. 3(b)). As used herein, the term vertical is defined to mean traversing the memory space in ascending address order. For example, as shown in FIG. 3, vertical orientation means moving from byte B0, then up to byte B1, etc. until the maximum address (MAX ADDRESS) is reached. This memory transfer is performed on an entire block of memory instead of the iterative read-modify-write per byte of memory as required by conventional methods. This can provide speed enhancements of up to 32:1 as compared to conventional transfer methods. As a direct block copy of the EPROM is performed, only those memory locations with usable instructions (represented by bytes B0–B4 in FIG. 3(b)) are copied into main memory.

Figure 5:
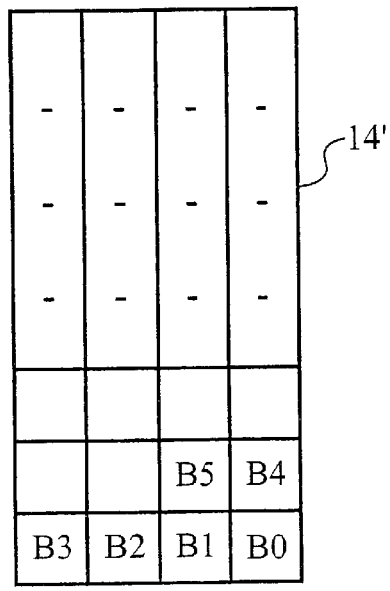
FIG. 5 is a schematic representation of the memory space of the set top-box illustrated in FIG. 2 upon completion of the improved boot-up method of the present invention.

In step 44, the block of instructions transferred in step 42 is then rearranged within the main memory (SDRAM 24), such that the transferred instructions are stored in the main memory in contiguous memory locations as illustrated in FIG. 5. As shown in FIG. 3(a), the rearrangement of instructions is performed in both a horizontal and vertical fashion such that byte B1 is transferred from an initial location above (either physically or logically) byte B0, to the immediate left of byte B0. As used herein, the term horizontal is meant to include right to left traversal within the memory space. The rearrangement of instructions within the DRAM 24 is performed by the microprocessor 26 executing the following instructions:

performed by the present invention can be implemented in hardware.

FIG. 5 is a schematic representation of the memory space of the set-top box 20 upon completion of the boot-up method of the present invention. As illustrated in greater detail in FIG. 5, the contents of memory locations B1, B2 and B3 have been shifted to reside in memory locations continuous to byte B0. Byte B4 is then shifted and re-written into the memory space previously allocated to byte B1, after byte B1 has been shifted. By reusing (writing over) memory space within SDRAM 24, the amount of memory required to perform the boot-up method of the present invention is significantly less as compared to conventional methods as illustrated in FIG. 1 because no unused or invalid instructions or information is transferred or stored in the main memory. By transferring only valid instructions or information, boot-up time is also greatly reduced. In experiments conducted by the inventors, the time required to boot-up a converter box was reduced from about five seconds to about one second. This provides for a significant increase in converter box operating efficiency as compared to presently available boot-up methods.

The above detailed description of the invention has been provided for the purposes of illustration and description. Although the present invention has been described with respect to a specific embodiment, various changes and modifications may be suggested to persons of ordinary skill in the art, and it is intended that the present invention encompass such changes and modifications as fall within the scope of the claims appended hereto.

What is claimed is:

1. An electronic apparatus comprising:

a microprocessor;

a first memory associated with the microprocessor;

```
for (i=0; i<L2_CODE_SIZE/16; i ++) {
        INVALIDATE(dest_address, 1);
        ALLOCATE(sdram_addr, 1)
        val = PACK16MSB(MERGEMSB((*dest_address+3)), (*(dest_address+2))),
                    MERGEMSB((*dest_address+1)), (*(dest_address))));
        dest_address +=4;
        *sdram_addr++ = val;
        val = PACK16MSB(MERGEMSB((*dest_address+3)), (*(dest_address+2))),
                    MERGEMSB((*dest_address+1)), (*(dest address))));
        dest_address +=4;
        *sdram_addr++ = val;
        val = PACK16MSB(MERGEMSB((*dest_address+3)), (*(dest_address+2))),
                    MERGEMSB((*dest_address+1)), (*(dest_address))));
        dest_address +=4;
        *sdram_addr++ = val;
        val = PACK16MSB(MERGEMSB((*dest_address+3)), (*(dest_address+2))),
                    MERGEMSB((* dest_address+1)), (*(dest_address))));
        dest_address +=4;
        *sdram_addr++ = val;
}
```

As illustrated by the program code above, the microprocessor 26 shifts the stored data four bytes to the left (horizontally) and then merges the data into its newly shifted memory location. In the TRIMEDIA microprocessor, this shifting and merging is performed by the PACK function. Although described with respect to the capabilities and programming specifics of the TRIMEDIA microprocessor, the shift and merge operation discussed above can be coded in a variety of different programming languages and such coding shall fall within the scope and teachings of this disclosure. Moreover, it is to be noted that the DMA transfer a second memory; and stored instructions to:

block transfer instructions from the second memory to the first memory;

rearrange a series of N bytes in the transferred instructions from a second memory space orientation to a first memory space orientation orthogonal to the second memory space orientation thereby forming rearranged bytes; and use the rearranged bytes to initialize the microprocessor.

2. The electronic apparatus of claim 1 wherein the block transfer comprises transferring the instructions to the first memory by direct memory access.

3. The electronic apparatus of claim 1 wherein the second memory is non-volatile memory.

4. The electronic apparatus of claim 3 wherein the second memory is a selective one of read only memory, non-volatile random access memory and an electronically programmable read only memory.

5. The electronic apparatus of claim 1 wherein the first memory is a selective one of a synchronous dynamic random access memory and a cache.

6. The electronic apparatus of claim 1 wherein the transferred instructions are rearranged by horizontally shifting the instructions within the first memory and vertically shifting the instructions within the first memory.

7. A method comprising:
providing an electronic apparatus comprising a microprocessor, a first memory associated with the microprocessor and a second memory; and
providing instructions to perform acts comprising:
block transferring instructions from the second memory to the first memory;
rearranging a series of N bytes in the transferred instructions from a second memory space orientation to a first memory space orientation orthogonal to the second memory space orientation thereby forming rearranged bytes; and
using the rearranged bytes to initialize the apparatus.

8. The method of claim 7 wherein block transferring comprises transferring the instructions to the first memory by direct memory access.

9. The method of claim 7 wherein the second memory is non-volatile memory.

10. The method of claim 9 wherein the second memory is a selective one of read only memory, non-volatile random access memory and an electronically programmable read only memory.

11. The method of claim 7 wherein the first memory is a selective one of a synchronous dynamic random access memory and a cache.

12. The method of claim 7 wherein rearranging comprises horizontally shifting the instructions within the first memory and vertically shifting the instructions within the first memory.

13. A method comprising:
block transferring instructions from a second memory to a first memory associated with a microprocessor-based controller;
rearranging a series of N bytes in the transferred instructions from a second memory space orientation to a first memory space orientation orthogonal to the second memory space orientation, thereby forming rearranged bytes; and
using the rearranged bytes to initialize the microprocessor-based controller.

14. The method of claim 13 further comprising using the initialized microprocessor-based controller to process data received from a media source for output via a media output device.

15. The method of claim 13 wherein block transferring comprises transferring the instructions to the first memory by direct memory access.

16. The method of claim 13 wherein the second memory is non-volatile memory.

17. The method of claim 16 wherein the second memory is a selective one of read only memory, non-volatile random access memory and an electronically programmable read only memory.

18. The method of claim 13 wherein the first memory is a selective one of a synchronous dynamic random access memory and a cache.

19. The method of claim 13 wherein rearranging comprises horizontally shifting the instructions within the first memory and vertically shifting the instructions within the first memory.

20. A computer-readable medium comprising instructions to:
block transfer instructions from a second memory to a first memory associated with a microprocessor;
rearrange a series of N bytes in the transferred instructions from a second memory space orientation to a first memory space orientation orthogonal to the second memory space orientation thereby forming rearranged bytes; and
use the rearranged bytes to initialize a microprocessor.

21. The computer-readable medium of claim 20 wherein the block transfer comprises transferring the instructions to the first memory by direct memory access.

22. The computer-readable medium of claim 20 wherein the second memory is non-volatile memory.

23. The computer-readable medium of claim 22 wherein the second memory is a selective one of read only memory, non-volatile random access memory and an electronically programmable read only memory.

24. The computer-readable medium of claim 20 wherein the first memory is a selective one of a synchronous dynamic random access memory and a cache.

25. The computer-readable medium of claim 20 wherein the transferred instructions are rearranged by horizontally shifting the instructions within the first memory and vertically shifting the instructions within the first memory.

* * * * *